United States Patent
Blackmon et al.

(10) Patent No.: US 6,513,091 B1
(45) Date of Patent: Jan. 28, 2003

(54) DATA ROUTING USING STATUS-RESPONSE SIGNALS

(75) Inventors: Herman Lee Blackmon, Rochester, MN (US); Robert Allen Drehmel, Goodhue, MN (US); Kent Harold Haselhorst, Byron, MN (US); James Anthony Marcella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,586

(22) Filed: Nov. 12, 1999

(51) Int. Cl.[7] ............................................. G06F 13/14
(52) U.S. Cl. ........................................ 710/316; 370/362
(58) Field of Search ................................. 710/107, 305, 710/316, 317; 370/351, 357, 362, 364

(56) References Cited

U.S. PATENT DOCUMENTS

| | | |
|---|---|---|
| 4,644,532 A | 2/1987 | George et al. ................. 370/94 |
| 4,667,305 A | 5/1987 | Dill et al. |
| 4,747,100 A | 5/1988 | Roach et al. .................. 370/86 |
| 4,864,563 A | 9/1989 | Pavey et al. ................. 370/94.1 |
| 5,228,134 A | 7/1993 | MacWilliams et al. |
| 5,355,467 A | 10/1994 | MacWilliams et al. |
| 5,408,646 A | 4/1995 | Olnowich et al. |
| 5,537,394 A | 7/1996 | Abe et al. ..................... 370/17 |
| 5,544,342 A | 8/1996 | Dean |
| 5,553,266 A | 9/1996 | Metzger et al. |
| 5,557,266 A | 9/1996 | Calvignac et al. ...... 340/825.02 |
| 5,604,735 A | 2/1997 | Levinson et al. ............ 370/360 |
| 5,630,095 A | 5/1997 | Snyder |
| 5,659,710 A | 8/1997 | Sherman et al. |
| 5,787,083 A | 7/1998 | Iwamoto et al. ............. 370/389 |
| 5,802,054 A | 9/1998 | Bellenger .................... 370/401 |
| 5,802,565 A | 9/1998 | McBride et al. ............. 711/125 |
| 5,805,798 A | 9/1998 | Kearns et al. |
| 5,848,145 A | 12/1998 | Gallagher et al. ........... 379/220 |
| 5,884,036 A | 3/1999 | Haley |
| 5,893,921 A | 4/1999 | Bucher et al. ............... 711/146 |
| 5,900,017 A | 5/1999 | Genduso et al. ............. 711/146 |
| 5,901,294 A | 5/1999 | Tran et al. |
| 5,911,052 A | 6/1999 | Singhal et al. |
| 5,913,044 A | 6/1999 | Tran et al. |
| 5,923,893 A | 7/1999 | Moyer et al. |
| 6,185,203 B1 * | 2/2001 | Berman ....................... 370/351 |

* cited by examiner

Primary Examiner—Glenn A. Auve
(74) Attorney, Agent, or Firm—James R. Nock

(57) ABSTRACT

A method and apparatus for routing data between bus devices, where each bus device is connected to a centralized switch via a point-to-point bus connection. The plurality of point-to-point bus connections collectively form a system bus. After a command is issued on the system bus, each bus device responds to the issued command by transmitting an address status response to a response combining logic module. The response combining logic module identifies which of the bus devices responded with a positive acknowledgment to the issued command, then forwards a device identifier of the bus device responding with the positive acknowledgment to the switch. The switch uses the device identifier returned via the response combining logic to route the data transfer associated with the issued command.

18 Claims, 4 Drawing Sheets

DATA ROUTING USING STATUS-RESPONSE SIGNALS

RELATED APPLICATIONS

This application is related to the following patent applications in the United States, hereby incorporated by reference: co-pending Ser. No. 09/439,189 filed Nov. 12, 1999 entitled, Processor-Memory Bus Architecture for Supporting Multiple Processors; and co-pending Ser. No. 09/439,068 filed Nov. 12, 1999 entitled, Bus Architecture Employing Varying Width Uni-Directional Command Bus.

TECHNICAL FIELD

This invention relates generally to the routing of data between bus devices in a computer system and more particularly relates to data routing between bus devices in a switch based topology where existing status/response protocol signals on the bus are used to provide routing feedback information to the switch.

BACKGROUND OF THE INVENTION

Today, computer systems utilizing switch based topologies are becoming increasingly popular. In a computer system utilizing a switch based topology, each bus device (e.g., a processor, an I/O hub, or a memory controller) is directly connected to a central switch by an electrically isolated point-to-point connection. When a first bus device (e.g., a processor) wants to send data to a second bus device (e.g., an I/O hub), the switch routes the data from the source device to the correct destination device.

In order to perform the data routing between the source device and the destination device, switches typically incorporate address range registers corresponding to each bus device connected to the switch. In a typical scenario, the switch compares the addresses of incoming commands to the address range values contained within the address range registers in order to route the data corresponding to the issued command to the correct destination bus device.

Unfortunately, the use of address range registers within the switch has some significant disadvantages. In a very large system, a correspondingly large number of address range registers are required in the switch to support the large number of bus devices connected to the switch. Also, the address range associated with a single bus device may include multiple discrete address sub-ranges. As a result, a large amount of logic is required within the switch in order to perform the address compare operations. The large number of address compare operations required in such a configuration can potentially introduce timing problems at the switch. Another disadvantage of address range registers is that they must be configured by software. If a large number of address range registers are present within the switch, the software configuration of the address range registers becomes a complex and time consuming task.

Thus, there is a need for an efficient apparatus and method for routing data signals in a computer system employing a switch-based topology. The method and apparatus should be easily implementable in a minimal amount of logic. The method and apparatus should also be able to handle any configuration of bus devices without introducing any software overhead.

These and other objects, features and advantages of the present invention will be further described and more readily apparent from the summary, detailed description and preferred embodiments, the drawing and the claims which follow.

SUMMARY OF THE INVENTION

The present invention provides an apparatus and method for routing data between multiple bus devices organized in a switch based topology. In the switch based topology of the preferred embodiment, the "system bus" is defined by a plurality of point-to-point connections between each of the plurality of bus devices and a centralized switch. Thus, data going from a first bus device to a second device is always routed via the switch.

Upon receiving a command, each bus device within the switch based topology responds by issuing an address status response signal to a response combining logic module residing between the bus device and the switch. The response combining logic module identifies which bus device (if any) responded to the command with a positive acknowledge. The response combining logic module then sends a bus device identifier to the switch via a destination route bus identifying which bus device responded with the positive acknowledge. The switch uses the device identifier returned via the response combining logic to route any subsequent data transfers associated with the issued command.

The preferred embodiment of the present invention offers several advantages over traditional data routing schemes. In contrast to traditional routing schemes which employ address range registers embedded in the switch to direct a data transfer, the preferred embodiment utilizes address status information returned as feedback to an issued command to determine the destination device for the data transfer.

As a result, no additional logic (i.e., address range registers) needs to be incorporated within the switch, simplifying the design of the switch and increasing the operational efficiency of the switch. Additionally, since address range registers are not required by the present invention, no software overhead is required to configure the address range registers. Finally, in contrast to traditional routing schemes where most or all of the nodes within the topology are aware of the entire topology and can make routing decisions, the preferred embodiment incorporates a central control structure where only the response combining logic module is aware of the topology and it alone provides routing decisions.

DETAILED DESCRIPTION OF THE INVENTION

Figure 1:
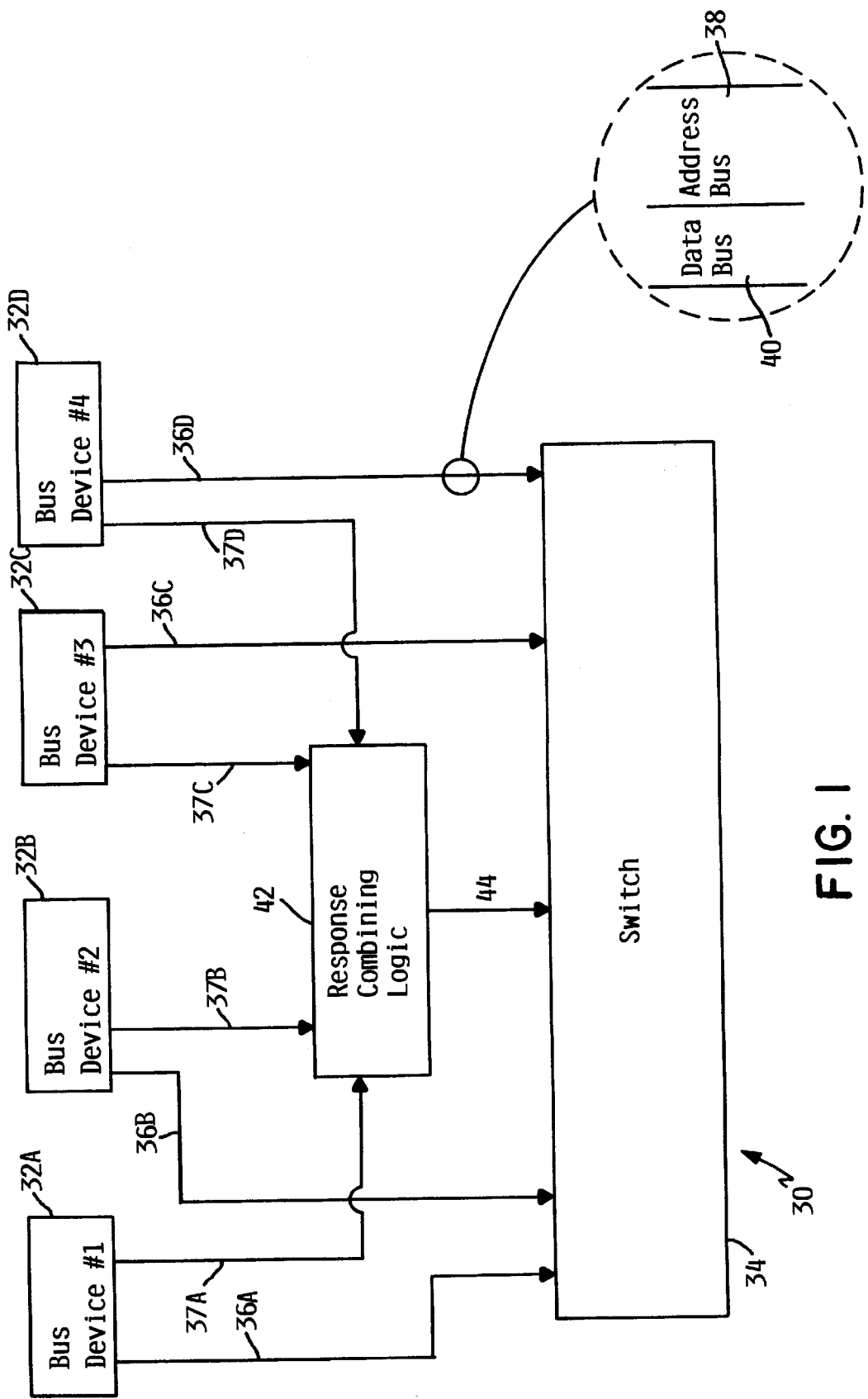
FIG. 1 is a block diagram of an apparatus for data routing in a switch based topology in accordance with the present invention.

FIG. 1 is a block diagram of an apparatus for data routing in a switch based topology, shown generally at 30. The illustrated switch based topology includes a plurality of bus devices 32A, 32B, 32C and 32D, hereinafter referred to collectively as 32, connected to a centralized switch 34 via a plurality of point-to-point connections 36A, 36B, 36C and 36D, hereinafter referred to collectively as 36. Bus devices 32 include, but are not limited to: processors, I/O hubs, and memory controllers. The plurality of point-to-point connections 36 collectively form a system bus for the switch based topology. A response combining logic module 42 is coupled to each bus device 32 via address status response signals 37A, 37B, 37C and 37D, hereinafter referred to collectively as 37. Address status response signals 37 carry a signal response generated by each of the bus devices 32 in response to an issued command on the system bus.

In the illustrated topology, all data routing between bus devices 32 must pass through switch 34. As an example, when a first bus device (e.g., a processor) sends data to a second bus device (e.g., an I/O hub), switch 34 routes the data from the first bus device to the second bus device via the two respective point-to-point connections 36.

Each point-to-point connection 36 includes a non-multiplexed address bus 38 and a data bus 40. In one embodiment, address bus 38 is 64 bits wide and supports addressing of multiple address spaces. For example, the multiple address spaces may include a multiple microchannel I/O space of 32 bits, a real memory space of 48 bits maximum, and a special purpose address space to pass interrupts and processor commands between bus devices 32. Address bus 38 includes an address tag used to identify the current operation to a particular Master and command instance. This tag is matched with a corresponding tag on data bus 40 at switch 34 to associate any data that corresponds to this address command.

Data bus 40 is 8 bytes wide for double word or 16 bytes wide for quad word. Address bus 38 and data bus 40 run independently, thus allowing true split transactions. As mentioned previously, data bus 40 includes an eight bit tag bus. The eight bit tag bus is utilized by bus devices to identify data when it is sent or received.

Since all requests and replies on the system bus are tagged, out-of-order replies are permitted, which are common for programmed I/O to another bus or in a non-uniform memory access time (NUMA) environment. The only time address bus 38 contents correspond to data bus 40 contents is on a data operation when the address tag and the data tag match.

For each address bus 38 operation there are three major points where information can be passed. The address command is always the first point, where a bus master drives address bus 38. The second point where information is passed in the address status mechanism occurs when bus devices 32 provide low latency feedback in response to the issued command. In one embodiment of the present invention, this low latency feedback information includes a two-bit address status output (AStatOut) signal and a two-bit address status input (AStatin) signal.

The AStatOut/AStatIn status response signals 37 provide a positive acknowledge of an address being accepted by a bus device, a null response, or an indication that the transaction should be terminated immediately (i.e., address parity error or retry). Table I of potential values for AstatOut/AStatIn status response signals 37 follows:

TABLE I

POTENTIAL VALUES FOR ADDRESS STATUS

| AStatOut <0:1> AStatIn <0:1> | Priority | Definition |
|---|---|---|
| 00 | 1 | Address Parity Error |
| 01 | 2 | Retry |
| 10 | 3 | Address Acknowledged |
| 11 | 4 | Null |

Both AStatOut and AStatIn are unidirectional instead of common open drain signals in order to provide higher speed operation. The AStatOut signal is driven from each of the plurality of bus devices 32 to response combining logic module 42 where the signals are combined and redriven back to bus devices 32 via the AStatIn signal (as described in greater detail in FIG. 3). When AStatOut signals are combined by response combining logic module 42, the highest priority signal value is determined, and that highest priority signal value is returned to the plurality of bus devices 32 via the AStatIn signal.

A slave or snooper drives the AStatOut signal(s) active starting on the second cycle after it samples an address, and holds the AStatOut signal(s) active for two clock cycles. The address status AStatIn is typically sampled 2 bus clock cycles later, however, in one embodiment, the signals may be latched and re-driven after one additional bus clock cycle. AStatOut and AStatIn are then driven anew if a new address cycle is begun, or inactivated. AStatOut and AStatIn are always driven (i.e., never tri-stated).

In the present invention, response combining logic module 42 also generates an additional response upon receiving the AStatOut signals from bus devices 32. Response combining logic 42 returns an identifier associated with the bus device 32 which issued a positive acknowledge signal (i.e., AStatOut value "10") to the switch via destination route bus 44. Returning this bus device identifier to switch 34 enables switch 34 to route data corresponding to the issued command to the correct destination bus device 32.

If the address command passes the second point successfully, then a third point of information transfer takes place where bus devices 32 provide somewhat longer latency feedback (an address response) for the issued command. This address response is a "boot time determined" latency composite response from all bus devices 32 for the purpose of providing coherency functionality.

Address commands are considered either Address Only (for read operations, cache operations, interrupts, etc) or Address-Data (for memory or I/O writes) commands. Address bus 38 is arbitrated for address only, or jointly with data bus 40 in case of an address-data operation to memory or I/O. The information returned on destination route bus 44 is utilized by switch 34 only for commands which involve the transmission of data.

Figure 2:
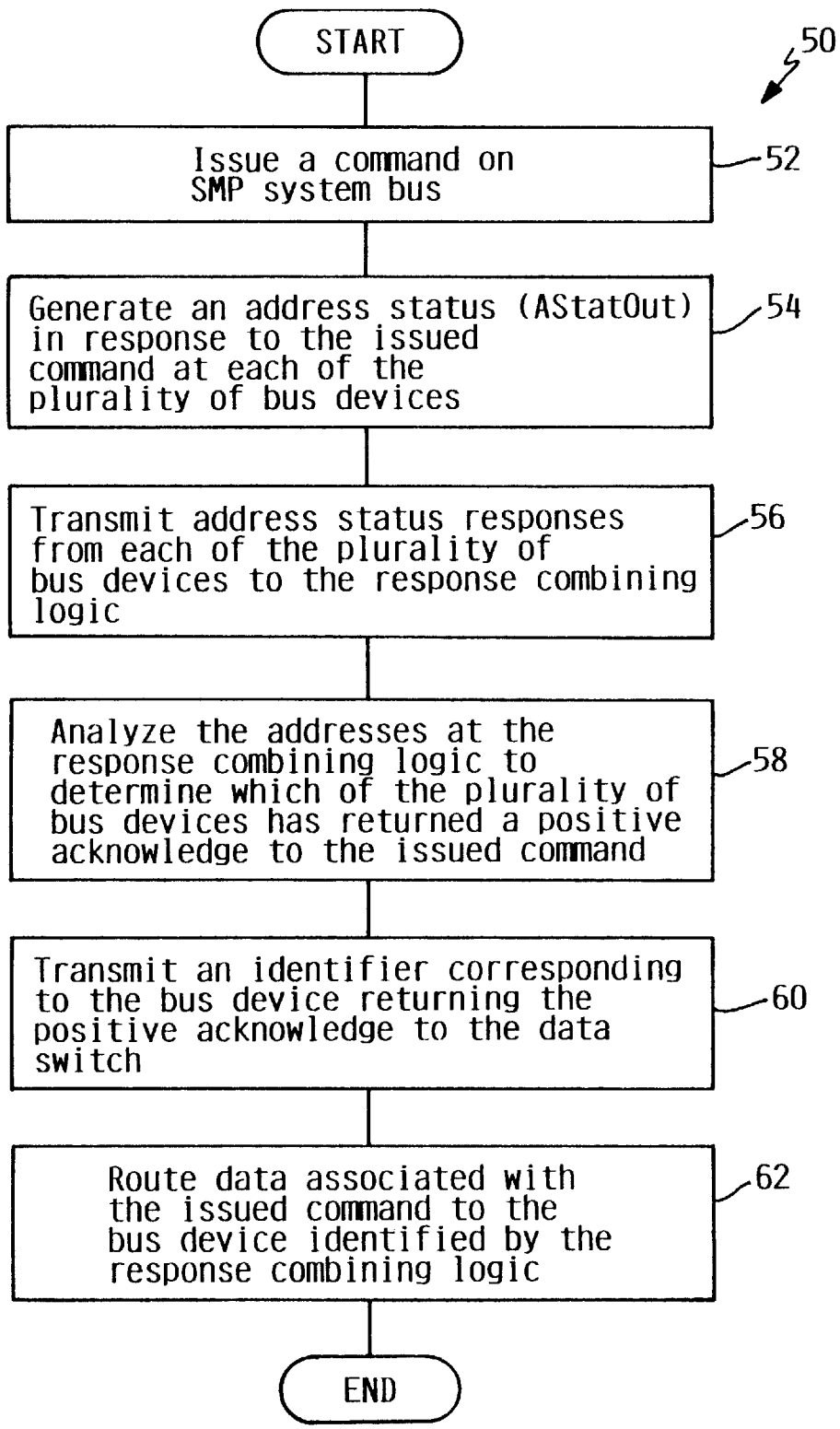
FIG. 2 is a flowchart illustrating a method for data routing in a switch based topology in accordance with the present invention.

FIG. 2 is a flowchart illustrating a method for data routing in a switch based topology in accordance with the preferred embodiment, as shown generally at 50. The method begins when a requestor issues a command on the system bus, as illustrated at block 52. In this step, a bus master (i.e., bus device 32) drives the address portion 38 of the system bus with an address, an operation type identifier which defines the particular operation using address bus 38, and the size of any data transferred as a result of the transaction. The address includes an eight bit address tag which is used to identify the operation to a particular Master and command instance. The address tag is matched with a corresponding tag on the data bus to associate any data that may belong to this address command.

Next, at block 54, all bus devices 32 generate an address status (AStatOut) signal in response to the issued command. The address status signal is a fixed low latency composite response issued by all bus devices 32 for the purpose of providing positive acknowledge, flow control, or address parity error feedback. The two-bit address status (AStatOut) signal is driven by all bus devices 32 as a response to sampling the address command.

After the address status responses have been generated at each of the plurality of bus devices, each of the plurality of bus devices transmits the address status responses to response combining logic module 42, as shown at block 56.

At block 58, response combining logic module 42 analyzes the address status responses. As previously described in Table I, there are four possible responses to the issued command (i.e., address parity error (priority 1), retry (priority 2), a positive address acknowledge (priority 3), and null (priority 4)). Response combining logic module 42 performs two functions. First, response combining logic module 42 determines the highest priority response returned from all bus devices 32 as a result of the issued command. This highest priority response is then re-transmitted to all bus devices 32 via the AStatIn signal. Secondly, response combining logic module 42 determines which of the plurality of bus devices 32 has returned a positive address acknowledge in response to the issued command.

At block 60, response combining logic module 42 transmits an identifier corresponding to the bus device 32 returning the positive acknowledge to the issued command via destination route bus 44. The bus device 32 returning the positive acknowledge to the issued command is the destination bus device for any subsequent data transfer performed by switch 34. Thus, switch 34 now has the information it needs to perform the data transfer necessary to complete the command.

Finally, at block 62, data associated with the issued command is routed via switch 34 to the bus device 32 identified by response combining logic module 42. As described previously, when an address command is issued, the address includes an address tag which is used to identify the operation to a particular Master and command instance. This address command is matched with a corresponding bus tag on the data bus to associate any data that may belong to this address command. In this way, a single bus device can have multiple concurrent outstanding transactions, and if data is requested, it may appear on the bus out of order due to differences in memory latency. The bus protocol does not care how tags are chosen, however all bus devices 32 must cooperate in the selection of tags so they are at all times unique within the bus environment.

Figure 3:
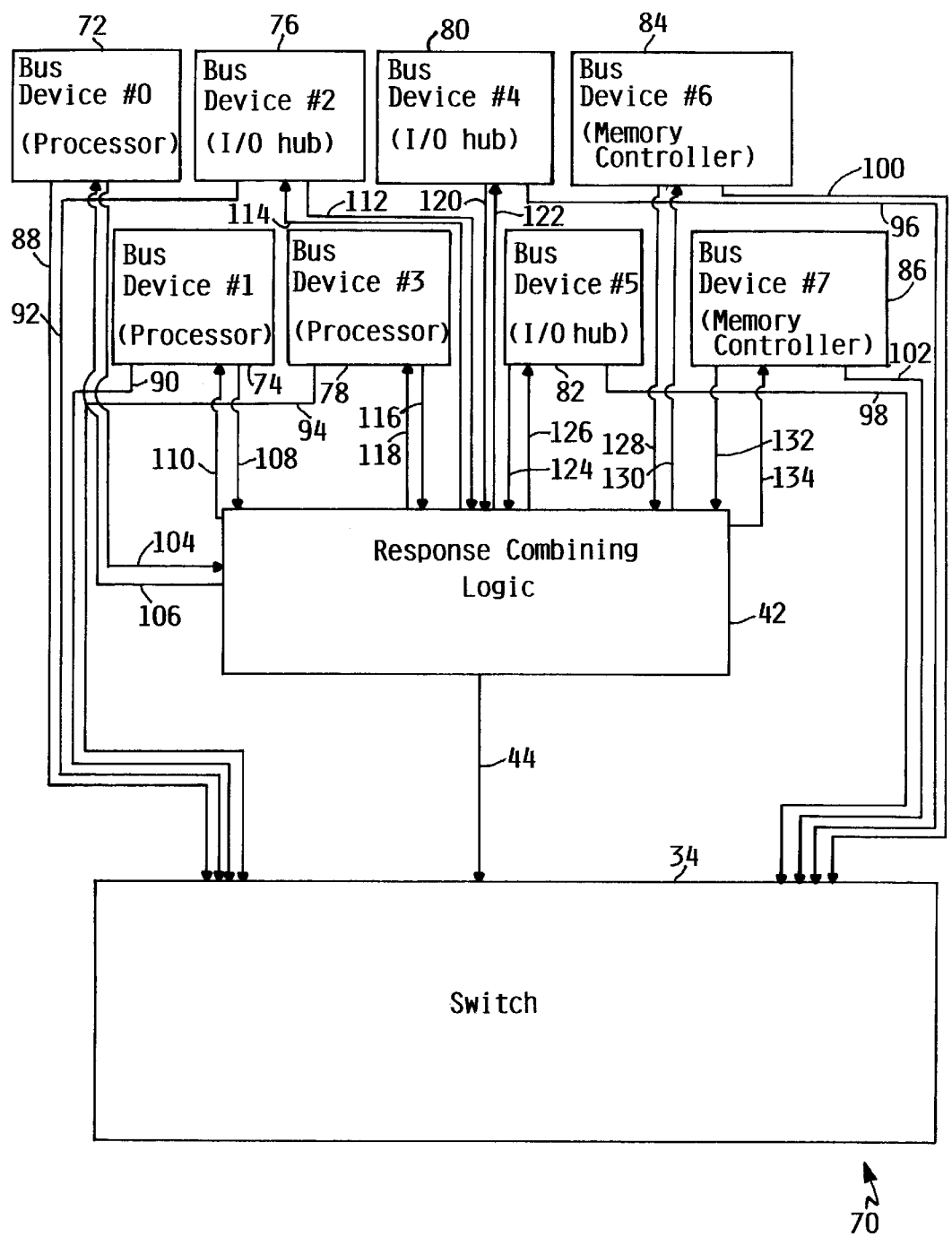
FIG. 3 is a block diagram illustrating an example data routing transaction in accordance with the present invention.

FIG. 3 is a block diagram illustrating an example transaction in accordance with the present invention, as shown generally at 70. In this example transaction, a command is issued by a processor ("Bus device #0") 72 to store data to a memory location via a memory controller ("Bus device #7") 86.

The issued command from processor 72 travels to switch 34 via a point-to-point connection 88. The issued command includes an address tag used by switch 34 in order to identify the operation. Switch 34 forwards the destination address for the issued command onto all of the point-to-point connections 88, 90, 92, 94, 96, 98, 100, and 102. Each of the bus devices 72, 74, 76, 78, 80, 82, 84 and 86 responds to the destination address of the issued command by generating an address response on AStatOut signals 104, 108, 112, 116, 120, 124, 128 and 132. In the illustrated example, Bus devices 72, 74, 76, 78, 80, 82, and 84 all issue a null response ("11") on their corresponding AStatOut busses 104, 108, 112, 116, 120, 124, and 128, while bus device 86 (i.e., the memory controller for which the command is intended) issues an address acknowledge response ("10") to the issued command on AStatOut bus 132.

Response combining logic module 42 receives the address responses from bus devices 72, 74, 76, 78, 80, 82, 84 and 86, then determines the highest priority response issued by the plurality of bus devices 32. In this example, the null response "11" issued by bus devices 72, 74, 76, 78, 80, 82 and 84 is the lowest priority response (level 4), and the address acknowledge response "10" issued by bus device 86 is a relatively higher priority response (level 3). As a result, response combining logic module 42 retransmits the highest priority response "10" back to all of the bus devices 72, 74, 76, 78, 80, 82, 84, and 86 via corresponding AStatIn busses 106, 110, 114, 118, 122, 126, 130, and 134.

Next, response combining logic module 42 identifies which of the bus devices 72, 74, 76, 78, 80, 82, 84 and 86 (if any) responded with a positive address acknowledge response. In the illustrative example, bus device 86 (i.e., the memory controller) responded with a positive address acknowledge response (i.e., a "10" signal on AStatOut bus 132) to the issued command. Response combining logic module 42 transmits a bus device identifier (e.g., a "111" signal corresponding to bus device #7) of the bus device 86 which issued the positive address acknowledge response to switch 34 via destination bus 44.

In the illustrated example, destination route bus 44 has a width of 3 bits, which allows the transfer of up to 8 unique bus device identifiers. The present invention anticipates that destination route bus 44 may require additional bits as the number of bus devices 32 on the system bus is increased, and that the expansion of the width of destination route bus 44 is easily implementable within the scope of the present invention.

Switch 34 now knows that the data transfer associated with the issued command is to be directed to bus device 86 (i.e., the memory controller). The switch also matches the address tag associated with the issued command to the corresponding data tag from the data bus, then transfers the data associated with the issued command to bus device 86 via point-to-point connection 102.

Figure 4:
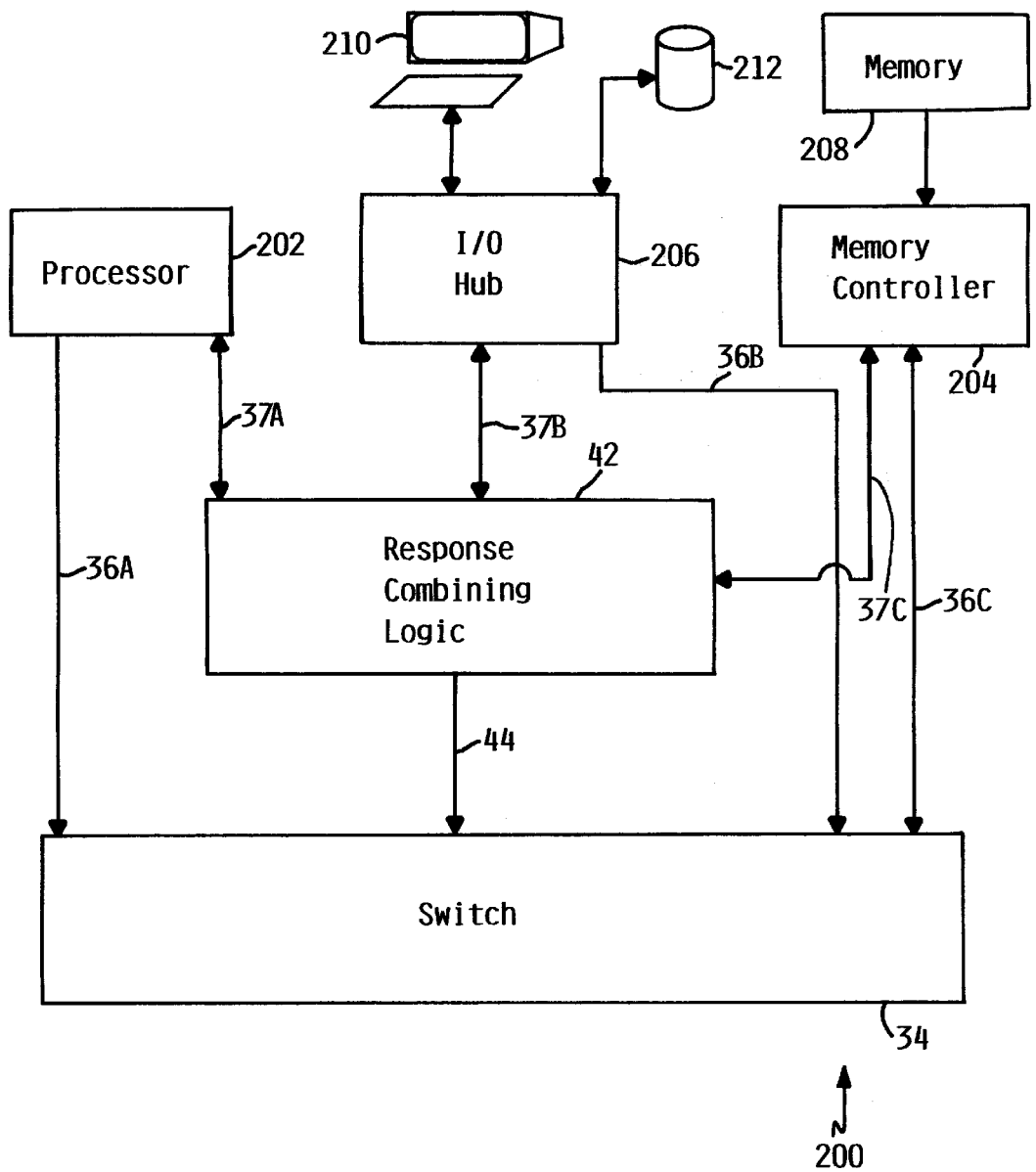
FIG. 4 is a block diagram of a computer system incorporating the data routing apparatus of the present invention.

FIG. 4 is a block diagram of a computer system 200 incorporating the data routing apparatus of the present invention. Computer system 200 includes a processor 202, an memory controller 204, and I/O hub 206, each connected by point-to-point connection 36 via central switch 34. The plurality of point-to-point connections 36 form a system bus.

In one embodiment, computer system 200 further includes memory 208 coupled to memory controller 204, a data terminal 210 coupled to I/O hub 206, and a disk drive 212 coupled to I/O hub 206. Computer system 200 also includes response combining logic module 42 which receives address status information from processor 202, memory controller 204, and I/O hub 206 after a command has been issued via address status/response signals, and returns an identifier of bus device 32 issuing a positive acknowledge to the issued command to switch 34 via destination route bus 44.

The present invention, therefore, is well adapted to carry out the objects and attain the ends and advantages mentioned, as well as others inherent therein. While preferred embodiments of the present invention are described for the purpose of disclosure, numerous other changes in the details of construction, arrangement of parts, compositions and materials selection, and processing steps can be carried out without departing from the spirit of the present invention, which is intended to be limited only by the scope of the appended claims.

What is claimed is:

1. An apparatus for routing data between a plurality of bus devices in a computer system, wherein each of the plurality of bus devices is connected to a switch via a point-to-point bus connection, the apparatus comprising:

a response combining logic module coupled to each of the plurality of bus devices and the switch for identifying which of the plurality of bus devices responds with a positive acknowledge for an issued command, wherein the response combining logic module further transfers the identity of the bus device which responds with a positive acknowledge from the response combining logic module to the switch; and a destination route bus coupled to the response combining logic module and the switch for enabling the transfer of the identity of the bus device which responds with a positive acknowledge from the response combining logic module to the switch.

2. The apparatus of claim 1, wherein the plurality of bus devices includes one or more processors.

3. The apparatus of claim 1 wherein the plurality of bus devices includes one or more I/O hubs.

4. The apparatus of claim 1, wherein the plurality of bus devices includes one or more memory controllers.

5. The apparatus of claim 1, wherein each of the plurality of electrically isolated point-to-point data bus connections includes a non-multiplexed address bus and a data bus.

6. The apparatus of claim 5, wherein the non-multiplexed address bus supports addressing of multiple address spaces.

7. The apparatus of claim 6, wherein the non-multiplexed address bus and the data bus run independently, enabling split transactions.

8. A method for routing data in a computer system, wherein the computer system comprises a plurality of bus devices coupled to a switch via a plurality of point-to-point data bus connections, and wherein the computer system further comprises a response combining logic module coupled to each of the plurality of bus devices, the method comprising the steps of:

issuing a command to the plurality of bus devices;

generating an address status response to the issued command at each of the plurality of bus devices;

transmitting the address status response from each of the plurality of bus devices to the response combining logic module;

analyzing the address status response from each of the plurality of bus devices to determine which of the plurality of bus devices returned a positive acknowledge response to the issued command;

transmitting a bus device identifier from the response combining logic module to the switch via a destination route bus, wherein the bus identifier identifies which of the plurality of bus devices returned the positive acknowledge to the issued command; and routing a data packet associated with the issued command to the bus device returning the positive acknowledge response to the issued command.

9. The method of claim 8, wherein the method step of analyzing the address status response from each of the plurality of bus devices further comprises the steps of:

determining which of the address status responses received from the plurality of bus devices is the highest priority response, and transmitting the highest priority response to each of the plurality of bus devices at a fixed latency.

10. The method of claim 9, wherein the address status responses include: a null response, a positive acknowledge response, an address parity error response, and a retry response.

11. The method of claim 10, wherein if the highest priority response is an address parity error response or a retry response, the issued command is terminated and no data transfer is performed.

12. The method of claim 8, wherein the method step of transmitting the address status response from each of the plurality of bus devices to the response combining logic module is performed as a fixed, low latency response.

13. The method of claim 8, wherein the method step of transmitting a bus device identifier from the response combining logic module to the switch via a destination route bus is performed at a fixed latency from the address status response.

14. A computer system, comprising:

a plurality of bus devices, including:
 a processor;
 an input/output hub, and
 a memory controller;

a switch;

a plurality of electrically isolated point-to-point data bus connections for connecting each of the plurality of bus devices to the switch;

a response combining logic module coupled to each of the plurality of bus devices and the switch for identifying which of the plurality of bus devices responds with a positive acknowledge for an issued command; and a destination route bus coupled to the response combining logic module and the switch for routing the identity of the bus device which responds with a positive acknowledge from the response combining logic module to the data switch.

15. The computer system of claim 14, wherein the computer system incorporates symmetric multi-processing (SMP) servers.

16. The computer system of claim 14, wherein each of the plurality of electrically isolated point-to-point data bus connections includes a non-multiplexed address bus and a data bus.

17. The computer system of claim 16, wherein the non-multiplexed address bus and the data bus run independently, enabling split transactions.

18. The computer system of claim 17, wherein the non-multiplexed address bus supports addressing of multiple address spaces.

* * * * *